(12) United States Patent
Pescarmona

(10) Patent No.: US 9,080,552 B2
(45) Date of Patent: Jul. 14, 2015

(54) WIND-DRIVEN MACHINE FOR GENERATING POWER

(71) Applicant: Industrias Metalúrgicas Pescarmona S.A.I.C.y F., Godoy Cruz, Mendoza (AR)

(72) Inventor: Enrique Pescarmona, Godoy Cruz (AR)

(73) Assignee: INDUSTRIAS METALURGICAS PESCARMONA S.A.I.C.Y F., Godoy Cruz, Mendoza (AR)

( * ) Notice: Subject to any disclaimer, the term of this patent is extended or adjusted under 35 U.S.C. 154(b) by 0 days.

(21) Appl. No.: 14/038,421

(22) Filed: Sep. 26, 2013

(65) Prior Publication Data

US 2014/0084592 A1    Mar. 27, 2014

(30) Foreign Application Priority Data

Sep. 27, 2012 (AR) .................... P120103592

(51) Int. Cl.
*F03D 11/00* (2006.01)
*F03D 9/00* (2006.01)
*F03D 1/00* (2006.01)

(52) U.S. Cl.
CPC ............... *F03D 9/002* (2013.01); *F03D 1/001* (2013.01); *F03D 1/005* (2013.01); *Y02E 10/721* (2013.01); *Y02E 10/728* (2013.01)

(58) Field of Classification Search
USPC .......................................................... 290/55
See application file for complete search history.

(56) References Cited

U.S. PATENT DOCUMENTS

| | | | |
|---|---|---|---|
| 6,285,090 B1 * | 9/2001 | Brutsaert et al. ................ 290/55 |
| 7,154,192 B2 * | 12/2006 | Jansen et al. .................... 290/55 |
| 7,548,008 B2 * | 6/2009 | Jansen et al. .................. 310/266 |
| 8,629,570 B1 * | 1/2014 | Kamenov ........................ 290/44 |
| 2007/0103027 A1* | 5/2007 | Jansen et al. .................. 310/266 |
| 2011/0293417 A1 * | 12/2011 | Watanabe ........................ 416/1 |
| 2012/0049531 A1 * | 3/2012 | Bray ............................... 290/55 |

FOREIGN PATENT DOCUMENTS

| | | | |
|---|---|---|---|
| DE | 202005007450 U1 * | 8/2005 |
| EP | 2253840 A1 * | 11/2010 |
| WO | WO 2004088131 A1 * | 10/2004 |
| WO | WO 2014164891 A1 * | 10/2014 |

* cited by examiner

*Primary Examiner* — Joseph Waks
(74) *Attorney, Agent, or Firm* — Birch, Stewart, Kolasch & Birch, LLP

(57) ABSTRACT

A wind-driven machine for generating power, which includes a structure divided so as to facilitate its transportation and assembly constituted by a tower, a gondola on its top end, a plurality of wind collecting blades and a rotary equipment which includes an electric power generator constituted by an inner stator fixed to the gondola and an outer rotor enclosing the inner stator, a plurality of supporting cups inside which a blade pitch regulating rotary hub is mounted and to which each wind collecting blade is fixed.

7 Claims, 3 Drawing Sheets

WIND-DRIVEN MACHINE FOR GENERATING POWER

BACKGROUND OF THE INVENTION

1. Field of the Invention

This invention relates to the field of devices, equipment and arrangements employed for use of the wind force and more particularly it refers to a wind-driven machine, preferably for great powers, which is constituted by a structure which is divided such that its parts can be easily transported by means of vehicles not exceeding the limit sizes or proportions of road circulation and which, additionally, allow an easier and more quickly assembly in situ.

2. Description of the Prior Art

Wind-driven machines, sometimes called wind-driven turbines, or simply wind turbines, are very well known in the art of the use of the wind force, for extracting both electric and mechanic power. Particularly, wind-driven machines are constituted by a tower of great height and a gondola mounted on the top end of the tower on which wind collecting blades or vanes of a rotary machine are arranged with a main shaft and all transmission mechanisms, brakes, regulators, multiplication box and generators. The aim of the great height of the tower is to arrange blades as distant as possible from the ground searching for winds with higher speed.

Each of the mentioned parts is generally transported to the site where the machine has to be installed. Sometimes some parts of the machine can be assembled or pre-assembled far from the site of installation and they can form equipment of great size that have to be transported in special vehicles which, also, can exceed the normal width of circulation roads such as routes and some motorways. Transportation of these parts or equipment demands a true analysis and study on logistics and urban and road circulation for determining, among other things, where it is feasible to circulate with loads exceeded in volume sizes and weight. It is therefore that the pre-assembly of set of parts is limited and generally only little and medium size equipment can be pre-assembled obliging to perform tasks in situ without the provision of manufacturing facilities and machines and tools which enormously facilitate works at the plant.

By virtue of deficiencies of conventional structures, it would be very advantageous to have a new structure of wind-driven machine which may be pre-assembled or assembled into compact equipment and transportable by vehicles not exceeding the circulation size limits and which may allow to finish the assembly of the machine in a quick, easy way and without the need of special machines and tools.

SUMMARY OF THE INVENTION

It is therefore an object of this invention to provide a new wind-driven machine of the type which comprises a mounting tower, a gondola and a plurality of wind collecting blades rotatively mounted on the gondola, wherein an outer generating equipment mounted on the gondola is provided, wherein the generating equipment is assembled at factory and can be easily transported to the site of installation of the machine, only remaining the connection of blades and the rigidization of equipment.

It is still an object of this invention to provide a wind-driven machine for generating power, which comprises a structure divided so as to facilitate its transportation and assembly constituted by a tower, a gondola on its top end, a plurality of wind collecting blades and a rotary equipment which comprises an electric power generator constituted by an inner stator fixed to such gondola and an outer rotor enclosing such inner stator, a plurality of supporting cups inside of which a blade pitch regulatoring rotary hub is mounted on which each wind collecting blade is fixed.

It is still an object of this invention to provide a wind-driven machine for generating power, of the type which comprises a tower having a top end wherein a gondola is arranged intended for housing generating mechanisms and arrangements and on which a rotary equipment is mounted which has wind collecting blades, wherein such rotary equipment comprises an electric power generator constituted by an inner stator fixed to such gondola and an outer rotor enclosing such inner stator, each magnetic poles and winding for generating electric power being indistinctly arranged in such inner stator and in such outer rotor; a plurality of supporting cups, one for each blade, which are equidistantly fixed on such outer rotor of the generator, and a blade pitch regulating hub rotatively mounted within each of such supporting cups, each wind collecting blade being fixed to one of such pitch regulating hubs.

BRIEF DESCRIPTION OF THE DRAWINGS

For more clarity purposes and understanding of the object of this invention, it has been illustrated in various figures, in which the invention has been represented in one of the preferred embodiments, all as a way of example, wherein.

DESCRIPTION OF THE PREFERRED EMBODIMENTS

Referring now to figures it can be seen that the invention refers to a wind-driven machine, or simply a wind turbine, for generating power, of the type which comprises a tower having a top end wherein a gondola is arranged intended for housing generating mechanisms and arrangements and on which a rotary equipment is mounted which has wind collecting blades.

Figure 1:
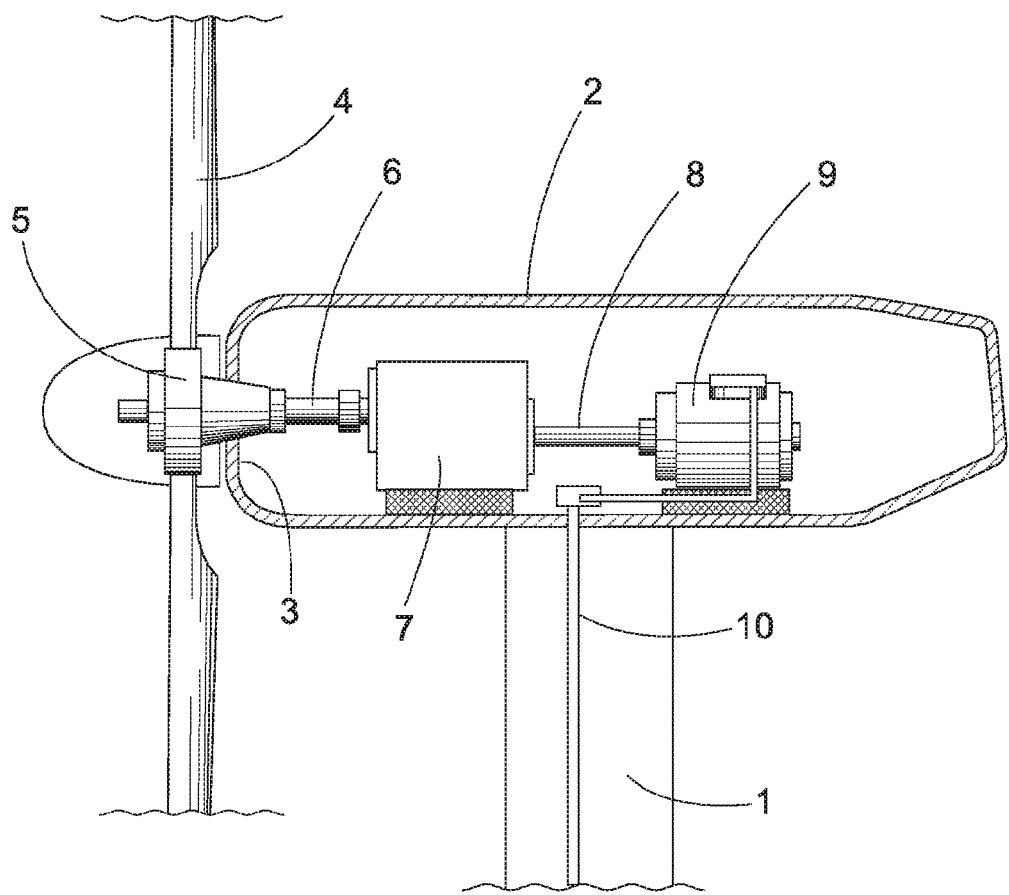
FIG. 1 shows a basic chart corresponding to a conventional wind-driven turbine, which object is to easily understand the conventional structure of a wind-driven machine.

In FIG. 1 a diagram of a conventional wind-driven machine or turbine can be seen, it is constituted by a tower 1 with enough height for uptaking winds of usable speeds, with an enclosure, generally closed and called gondola 2 which is mounted on the top end of the tower 1. The gondola 2 can be of the fixed or rotary type depending on the type and sizes of the machine. At the front or nose 3 of the gondola there is a wind-collecting rotary plane constituted by a plurality of blades or vanes 4 which are fixed to a hub 5 on which blades can be mounted by means of a mechanism that may allow them to rotate around their longitudinal geometric axis shaft in order to change the pitch thereof. The hub 5 transmits its rotating movement to a main shaft assembly 6 which is in its turn connected, by means of known coupling systems, to a multiplier box 7, such as a gear box, in charge of increasing the rotating speed of the shaft 6 such that its rotating output through the shaft section 8 feed an electric generator 9 which produced power is carried to the producing station through conductors 10. The construction of a wind-driven turbine of this type and even more modern, many times demands the construction and assembly in situ generating many complications, excessive time consuming and the need of machines and tools which are only available at manufacturing plants and which transportation is costly. In more modern structures some of the parts are pre-manufactured at plant and transported to the facility for their mounting, however, these parts are so big that generally they can not be transported by normal roads or roads, such as routes or motorways, they have to be cut in order for vehicles transporting these components to pass.

Unlike conventional machines, the invention proposes a wind-driven machine for high powers, higher than 4 Mw, wherein, among other things, the generator has particular features in its design in order to regidize its structure, which is achieved closing the structure of rotating parts of the generator with rigidizing crossbars or outer rigidizing ring which connects the blades supporting cones. According to other aspect of the invention, the machine is divided into its components in such a way that it may facilitate their pulling-up and the assembly of the equipment at height, in addition to allowing ground transportation, complying with normal size limits even for high power machines.

More particularly, according to the invention, a high power wind-driven machine is proposed, preferably higher than 4 MW, which also comprises a tower and a gondola with a wind collecting blades set, wherein the machine is divided into components in such a way that facilitates their pulling-up and the assembly of the equipment at heights, in addition to allowing ground transportation even for high power facilities. Blades of this wind-driven machine are mounted on a rotary equipment indicated with the general reference 11 in FIGS. 2, 3 and 4. Such rotary equipment 11 comprises an electric power generator 12, which is a synchronous generator with outer rotor, constituted by an inner stator 13 fixed to the gondola and an outer rotor 14 enclosing such inner stator 13. Such inner stator 13 comprises a disc-shaped part 15 fixed to such gondola by its central portion with a peripheral body 16. More particularly, the disc part 15 is firmly fixed, by means of screws or bolts 17 to a extension 18 of the gondola (not illustrated).

The fixed inner stator 13 is enclosed within the outer rotor 14 which comprises a cylindrical peripheral wall 19, firmly fixed to both front 20 and rear 21 circular walls and an intermediate wing 22 extending from such front wall 20 and is concentric with such cylindrical peripheral wall 19. the active parts of the generator, that is to say, the magnetic poles, generators of the magnetic field, and winding, for generating electric power, are indistinctly arranged each in such inner stator 13 and in such outer rotor 14, and, more particularly, the magnetic poles and such winding for generating electric power are arranged ones in such peripheral wing 16 of the stator and others in such cylindrical peripheral wall 19 and in such intermediate wing 22 of the rotor. Poles 23 generating the magnetic field may be constituted by permanent magnets or with projecting poles winded with helixes constituted by superconducting material. The stator part of the generator may be constituted by coils 24 made of conducting material with single or double winding, alternatively made of superconducting material. Refrigeration in the case of conducting coils is by means of liquid suitable for extracting heat from winding and transferring it to the environment through an interexchanger. In the event of being superconducting coils refrigeration may be performed based on liquid nitrogen or other product capable of keeping the superconductor below its maximum working temperature. The stator 14 is rotatively mounted on such nose 18 of the gondola for example through rolling equipment 25, 26 of any known type prepared for withstanding loads of a machine of this type.

Also, according to la invention a plurality of supporting cups is provided, one for each blade, which are equidistantly fixed on such outer rotor 14 of the generator. In the example of the invention there are provided three supporting cups 27 because the machine will have three blades which are going to be connected to each cup 27 as described below. The supporting cup 27 has the shape of truncated cone, the minor base 28 of the cone being fixed against such peripheral wall 19 of the outer rotor 14. The minor base 28 may be constituted by one supplementary part, as shown in FIG. 3, or may be part of the cone itself. In its turn, the major base 29 of the truncated cone is radially open outwards and has, preferably a connecting flange 30, see FIG. 2. The supporting cups 27 are angularly distributed and equidistantly around the generator and, in the case of three blades, they shall be arranged at 120°. The supporting cups 27 are rigidly connected one to the other by means of rigidizing crossbars 31 which may be fixed, for example by bolts, to respective edges 32 of such connecting flanges 30. This is a closed structure with great structural rigidity in the rotating component of the machine for withstanding efforts caused by the wind.

For being able to change the pitch of each blade there is provided a blade pitch regulating hub 33 rotatively mounted inside each of such supporting cups 27, as can be best seen in FIG. 3. The pitch regulating hub 33 preferably comprises a body of conical general configuration which is inserted inside the corresponding supporting cup 27 and which has, also as a cup 27, the body of conical general configuration with a minor base 34 housed on the bottom of such cup 27 and with a major base 35 raising from such open major base 29 of the supporting cup. Major bases 35 of all hubs 33 are intended to be connected to the plurality of blades. More particularly, each blade 36 is fixed to such major base 35 by means of, for example, screws, bolts or pins of the type known as "T-bolt" 37, well known in the art under this name.

The pitch regulating hub 33 is rotatively mounted inside the cup 27 for being able to rotate the blade 36 around its longitudinal geometric shaft so as to alter the angular position of their faces or planes facing the wind, briefly, for changing the helix pitch. Therefore, the hub 33 is mounted by means of outer 38 and inner 39 lubricated rollers or sliding pads, arranged on the periphery of the minor base 34 and the major base 35 of the hub 33. A driving mechanism, indicated in an schematic and general way with reference 40 is in charge of rotating the hub 33 on its rollers, generating the rotating movement with respect to the fixed cup 27. This cone-shaped device allows to firmly hold the blade 36 which, due to its big size, has an important root diameter.

Figure 2:
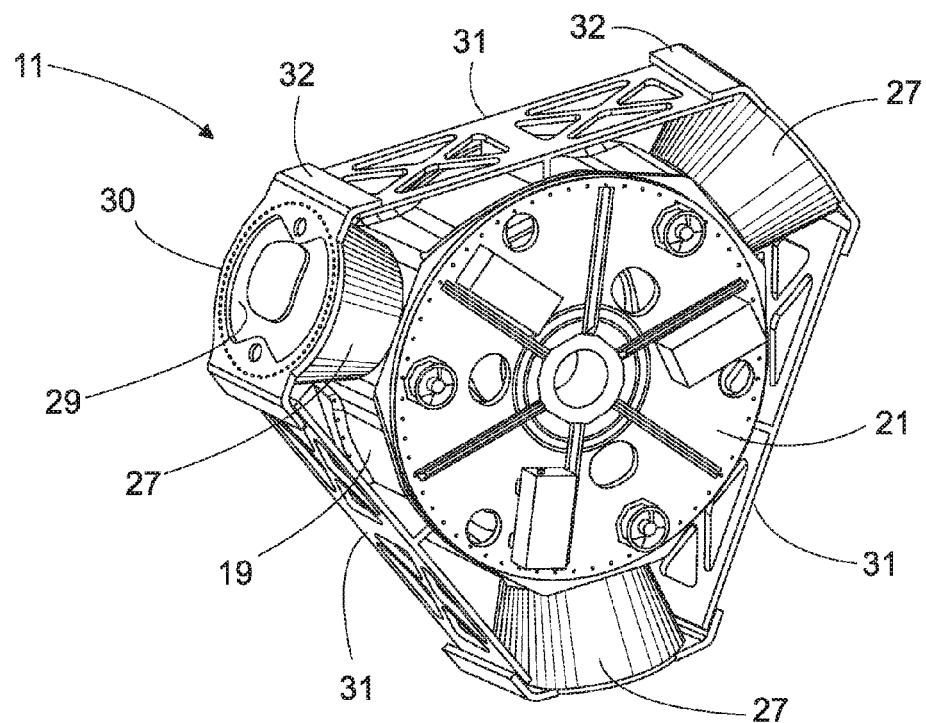
FIG. 2 shows a perspective view of the generating equipment which is mounted on the gondola, according to this invention.
Figure 3:
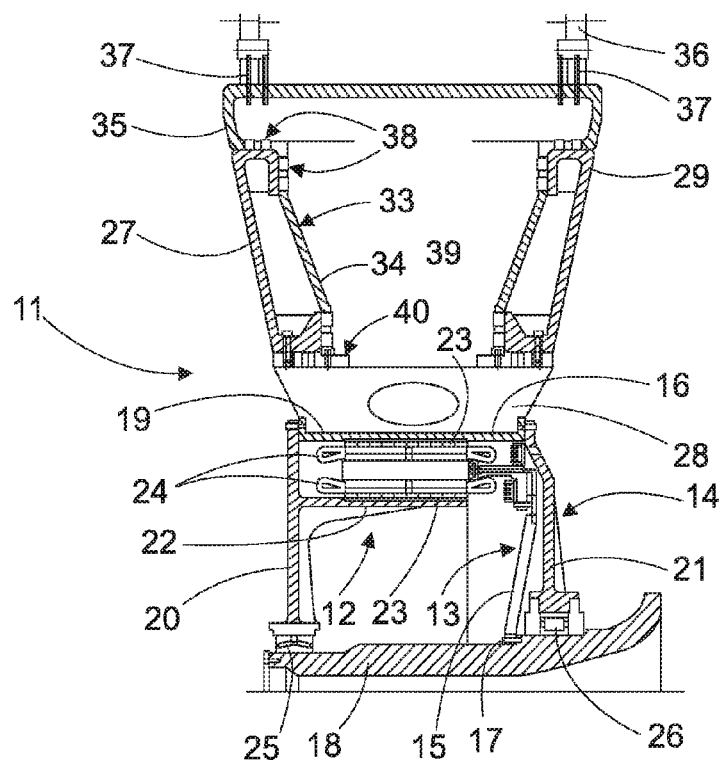
FIG. 3 shows a cross-section of the generating equipment of FIG. 2 mounted on the gondola.
Figure 4:
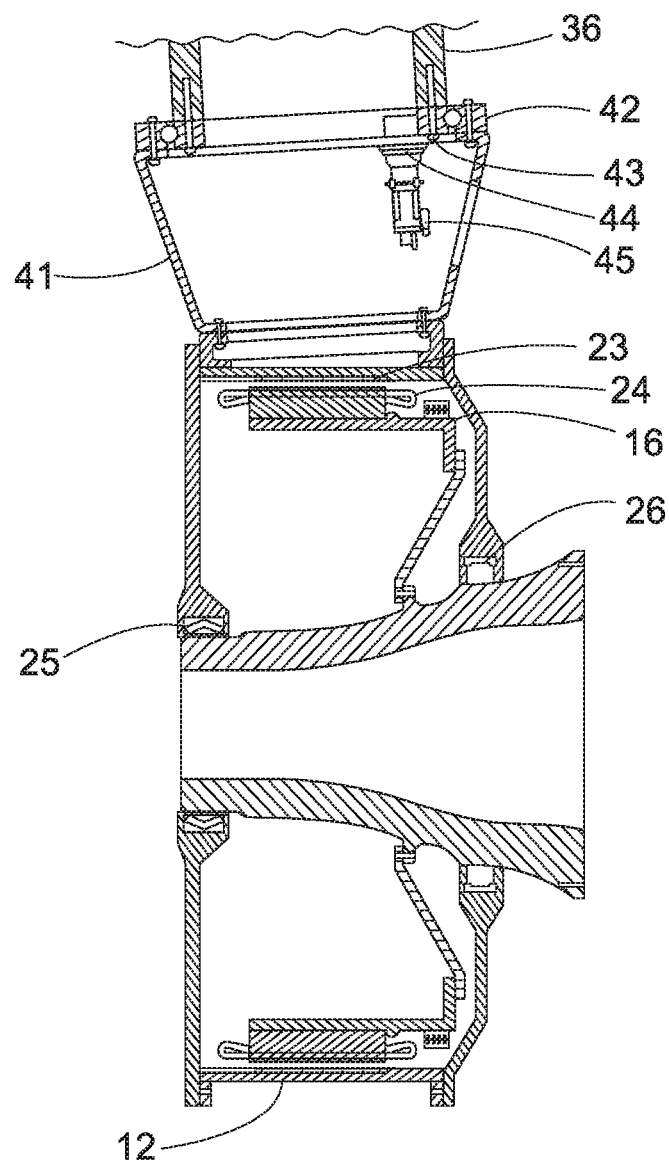
FIG. 4 shows a cross-section of the generating equipment according to an alternative to the invention.

According to an alternative to the invention, as illustrated in FIG. 4, the generator is composed of elements equal or equivalent to the embodiment of FIGS. 2 and 3, therefore same references have been kept. In FIG. 4 the generator stator winding is simple while in FIG. 3 it is a double winding. With regard to the supporting cups, they have changed in their constructing shape providing in this case supporting cups 41 which are bolted to the periphery of the outer rotor 14. The blade 36 is fixed to the supporting cup or cone 41 by means of a mobile structure 42 to which they are fixed, in its turn, by means of bolts 43 known in the art by their name T-bolt. In order to make the blade 36 rotate and in order to change its pitch there is provided a changing mechanism 44 which is driven by an electric motor 45 although it could be driven by an hydraulic circuit which is not illustrated.

The divided constructing configuration proposed for this invention permits to pull up the complete generator in one only part, fixing it to the gondola mounted on the end of the tower, to which blades 36 are individually connected, with the supporting cups and pitch regulating hubs, and finally, the rigidizing crossbars for achieving the closed structure with high rigidity.

This divided design, in addition to facilitating the pulling-up, it also allows transportation by road complying with normal size limits of circulation, thus contributing with competitive advantages.

Finally, the tower is able to withstand great efforts to which this machine of great size is subjected and it is completely made in sections of post-tensioned concrete or it is partially made of concrete with a metal top section. Concrete sections of the tower may be formed at the site of the aeolian park which facilitates transportation of components of the tower.

While preferred embodiments of the present invention have been illustrated and described, it will be obvious to those skilled in the art that various changes and modifications may be made therein without departing from the scope of the invention as defined in the appended claims.

I claim:

1. A wind-driven machine for generating power, of the type comprising a tower having a top end wherein a gondola is arranged and a rotary equipment mounted in the gondola, the rotary equipment having wind collecting blades, wherein said rotary equipment comprises:
   an electric power generator comprising an inner stator fixed to said gondola and an outer rotor enclosing said inner stator,
   magnetic poles and winding for generating electric power, with the poles and the winding being arranged in said inner stator and in said outer rotor,
   a plurality of supporting cups, one for each blade, which are equidistantly fixed in said outer rotor of the generator, said supporting cup having a truncated cone shape, wherein the cone has a minor base fixed to said peripheral wall of the outer rotor, and a major base being radially open outwards and
   a blade pitch regulating hub rotatively mounted within each of said supporting cups, with each wind collecting blade being connected to one of said pitch regulating hubs, wherein said blade pitch regulating hub comprises a body of conical general configuration inserted inside a corresponding supporting cup, said body of conical general configuration having a major base raising from above said open major base of the supporting cup.

2. The machine of claim 1, wherein said inner stator comprises a disc-shaped part with a peripheral wing, said disc-shaped part having a central portion fixed to said gondola.

3. The machine of claim 2, wherein said outer rotor of the generator comprises a cylindrical peripheral wall, front and rear circular walls and a intermediate wing concentric with said cylindrical peripheral wall.

4. The machine of claim 3, wherein said magnetic poles and said winding for generating electric power are each arranged in a respective one of said peripheral wing of the stator, and said cylindrical peripheral wall and said intermediate wing of the rotor.

5. The machine of claim 1, wherein each blade is fixed to said major base of a blade pitch regulating hub.

6. The machine of claim 1, wherein said supporting cups are connected one to the other by means of rigidizing crossbars.

7. The machine of claim 6, wherein said rigidizing crossbars are fixed to flanges of said open major base of each supporting cup.

* * * * *